(12) United States Patent
Izawa et al.

(10) Patent No.: US 6,519,379 B1
(45) Date of Patent: Feb. 11, 2003

(54) OPTICAL INTEGRATED DEVICE AND MANUFACTURING METHOD THEREOF

(75) Inventors: Masataka Izawa, Saitama-ken (JP); Kiyoshi Takei, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 29 days.

(21) Appl. No.: 09/583,921

(22) Filed: May 31, 2000

(30) Foreign Application Priority Data

May 31, 1999 (JP) ............................................. 11-152704

(51) Int. Cl.[7] ................................................. G02B 6/12
(52) U.S. Cl. ........................................ 385/14; 369/44.12
(58) Field of Search .................... 385/14, 37; 369/44.12

(56) References Cited

U.S. PATENT DOCUMENTS

| | | | | |
|---|---|---|---|---|
| 4,861,128 A | * | 8/1989 | Ishikawa et al. | 385/37 |
| 5,247,506 A | * | 9/1993 | Sugiura | 369/110.03 |
| 5,418,765 A | * | 5/1995 | Misawa et al. | 369/44.12 |
| 5,471,440 A | * | 11/1995 | Isobe | 369/110.02 |
| 5,835,458 A | * | 11/1998 | Bischel et al. | 369/44.12 |

\* cited by examiner

*Primary Examiner*—John D. Lee
*Assistant Examiner*—Scott Knauss
(74) *Attorney, Agent, or Firm*—Young & Thompson

(57) ABSTRACT

An optical integrated device is used in an optical pickup device which irradiates a light onto an optical information storage medium and receives a reflected light reflected by the storage medium. The optical integrated device includes: a light wave coupling element for generating at least a guided light from the reflected light; an optical waveguide unit for propagating the guided light, the optical waveguide unit including a multiple optical waveguides and at least a clad layer formed between the optical waveguides; and a light receiving element for receiving the light from the optical waveguide unit.

3 Claims, 20 Drawing Sheets

FIG. 3A
OPTICAL WAVEGUIDE 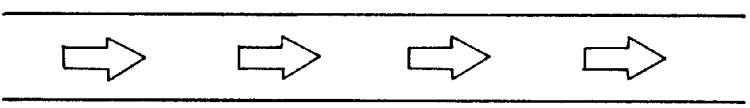
OPTICAL WAVEGUIDE 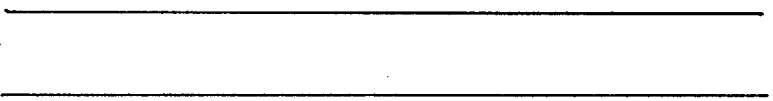
FIG. 3B
OPTICAL WAVEGUIDE 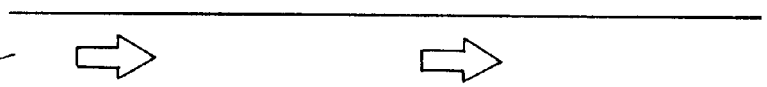
OPTICAL WAVEGUIDE 

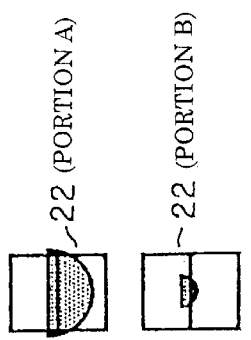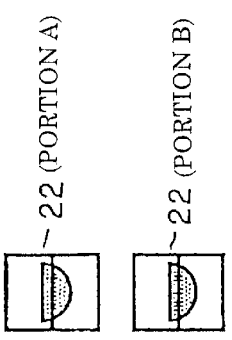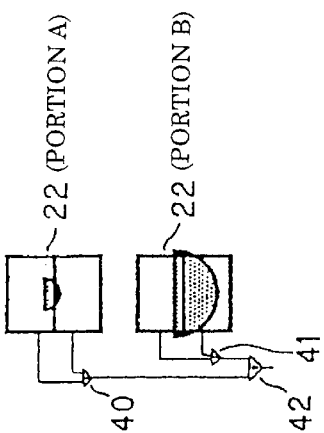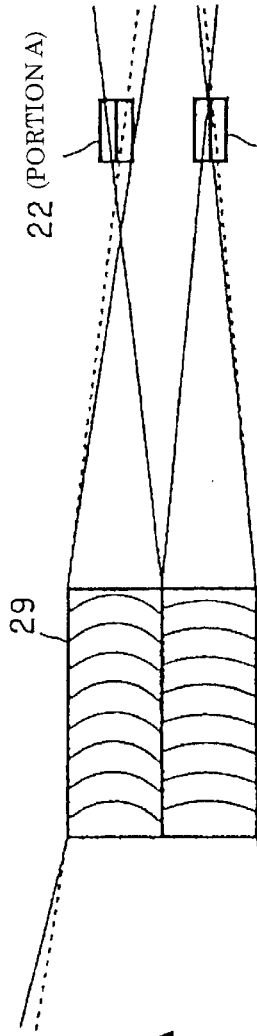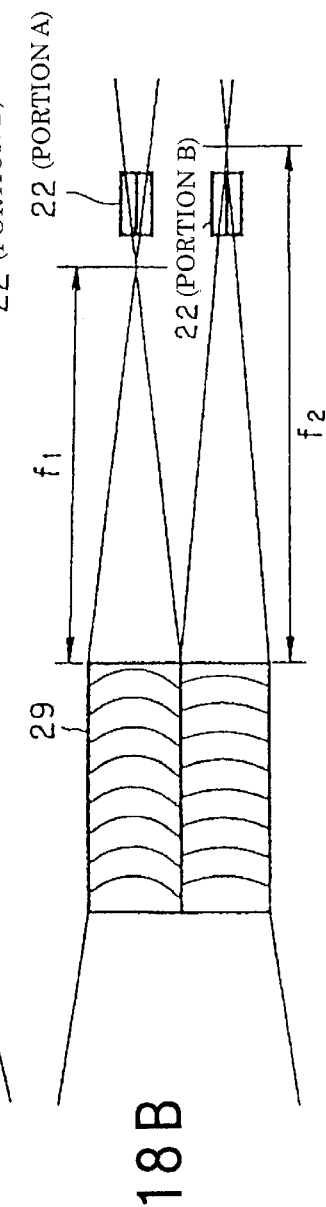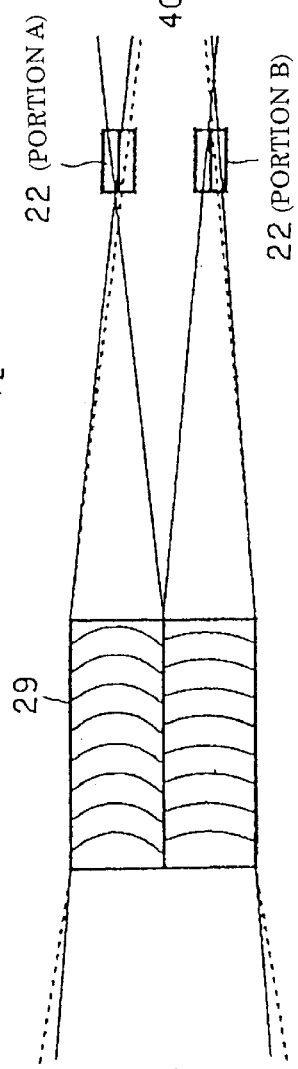

OPTICAL INTEGRATED DEVICE AND MANUFACTURING METHOD THEREOF

BACKGROUND OF THE INVENTION

1. Field of the Invention

The present invention relates to an optical integrated device for use in an optical pickup device which optically reproduces information recorded on a storage medium such as CD (Compact Disc), LVD (Laser Video Disc), DVD and the like and/or optically records information onto the storage medium. The present invention also relates to a method of manufacturing the optical integrated device.

2. Description of Related Art

As an example of the above described optical pickup device, Japanese Laid-open patent application No. 4-89634 discloses an optical pickup device which has a semiconductor laser serving as a light emitting means and provided on a semiconductor substrate. A phase film layer, a polarization film layer, a grating, an optical waveguide and a first light receiving portion are formed on the semiconductor substrate in a laminated fashion, and a second light emitting portion is formed at an edge of the optical waveguide.

In this optical pickup, when the semiconductor laser irradiates a laser light on the phase film layer with a predetermined depression angle, the laser light is transmitted through the phase film layer, is reflected by the surface of the polarization film layer and is converged and projected onto the information surface of the optical disc. The laser light diffracted and reflected by the information surface of the optical disc is transmitted through the phase film layer and the polarization film layer to be incident upon the grating. A major part of the reflected laser light passes through the grating to be the transmissive light directed to the lower part of the substrate, and the remaining part of the reflected laser light becomes the guided light which is propagated through the optical waveguide. The transmissive light is received by the first light receiving portion which generates a tracking error signal and an RF signal. The guided light is received by the second light receiving portion formed at the edge of the optical waveguide, and the second light receiving portion generates a focus error signal.

According to the above optical pickup device, since those components are integrated by the semiconductor substrate manufacturing process, the device may be miniaturized and the using efficiency of the light quantity may be improved.

However, in the above-described optical pickup device, the second light receiving portion for generating the focus error signal has such a special positional relation with the first light receiving portion that the second light receiving portion is positioned normal to the first light receiving portion and the optical waveguide. Hence, there is a problem that a general light receiving device cannot be used.

As a result, manufacturing the optical pickup device requires producing a new light receiving portion. Also, since the manufacturing steps are relatively complicated due to the above special positional relation, the manufacturing cost of the optical pickup increases.

SUMMARY OF THE INVENTION

It is an object of the present invention to provide a optical integrated device for use in an optical pickup device, which enables integration by the semiconductor substrate manufacturing process, miniaturization of the whole device, improvement of efficient use of light quantity, effective use of the existing manufacturing system, easy manufacturing and manufacturing cost reduction.

According to one aspect of the present invention, there is provided an optical integrated device for use in an optical pickup device which irradiates a light onto an optical information storage medium and receives a reflected light reflected by the storage medium, the optical integrated device including: a light wave coupling element for generating at least a guided light from the reflected light; an optical waveguide unit for propagating the guided light, the optical waveguide unit including a multiple optical waveguides and at least a clad layer formed between the optical waveguides; and a light receiving element for receiving the light from the optical waveguide unit.

In accordance with the optical integrated device, the light wave coupling element generates at least a guided light from the reflected light, and the optical waveguide unit propagates the guided light. The optical waveguide unit includes a multiple optical waveguides and at least a clad layer formed between the optical waveguides. The light receiving element receives the light from the optical waveguide unit.

In a preferred embodiment, the optical waveguides in the optical waveguide unit may have identical refractive indexes, and the clad layers may have identical refractive indexes.

The optical waveguide unit may include three or more waveguides, and the optical waveguide of an uppermost layer and the optical waveguide of a lowermost layer may have thicknesses larger than thickness of the optical waveguide at intermediate layer between the uppermost layer and the lowermost layer.

The light wave coupling element, the optical waveguide unit and the light receiving element may be formed on a semiconductor substrate in a laminated fashion, and the light receiving element may receive a radiated light which is radiated by the optical waveguide to the semiconductor substrate due to phase matching.

The optical integrated device may further include a light shielding film formed on the optical waveguide of the uppermost layer at a position corresponding to a position of the light receiving element. The light receiving element may read out information recorded on the storage media and read out position information indicating a position of the light irradiated on the storage medium on a surface thereof.

The light receiving element may read out focal point position information indicating a position of the focal point of the light with respect to the storage medium.

According to another aspect of the present invention, there is provided a method of manufacturing an optical integrated device for use in an optical pickup device which irradiates a light onto an optical information storage medium and receives a reflected light reflected by the storage medium, the method including the steps of: heat-processing a semiconductor substrate to form heat-oxidized film on the semiconductor substrate, except for a partial non-processed area; laminating a protection layer on the semiconductor substrate having the heat-oxidized film, except for the non-processed area; forming, on the non-processed area, an optical waveguide laminated unit in which optical waveguides and clad layers are alternately laminated; and forming an optical waveguide of an uppermost layer at an area including the area where the heat-oxidized film and the protection layer are formed and the area where the optical waveguide laminated unit is formed.

The step of forming the optical waveguide laminated unit may form the optical waveguides and the clad layers in a multi-layer structure by alternately laminating the waveguides and the clad layers for multiple times. The heat-processing step and the protection layer laminating step may include etching the non-processed area after the heat-processing and the laminating.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3A is a diagram for explaining the state where two optical waveguide are positioned remotely from each other.

FIG. 3B is a diagram for explaining the state where two optical wave are positioned closely to each other.

FIGS. 18A to 18F are diagrams showing the positional relation of the grating and the second light receiving portion when the optical integrated device of the optical pickup device shown in FIG. 16 is viewed from above.

FIGS. 18D to 18F are diagrams showing the laser light converging states when the optical integrated device of the optical pickup shown in FIG. 16 is viewed from above.

DETAILED DESCRIPTION OF THE PREFERRED EMBODIMENTS

The preferred embodiments of the present invention will now be described below with reference to the attached drawings.

[1] 1st Embodiment

First of all, an outline of an optical pickup device according to the present invention will be described.

(i) Outline of Optical Pickup Device

Figure 1:
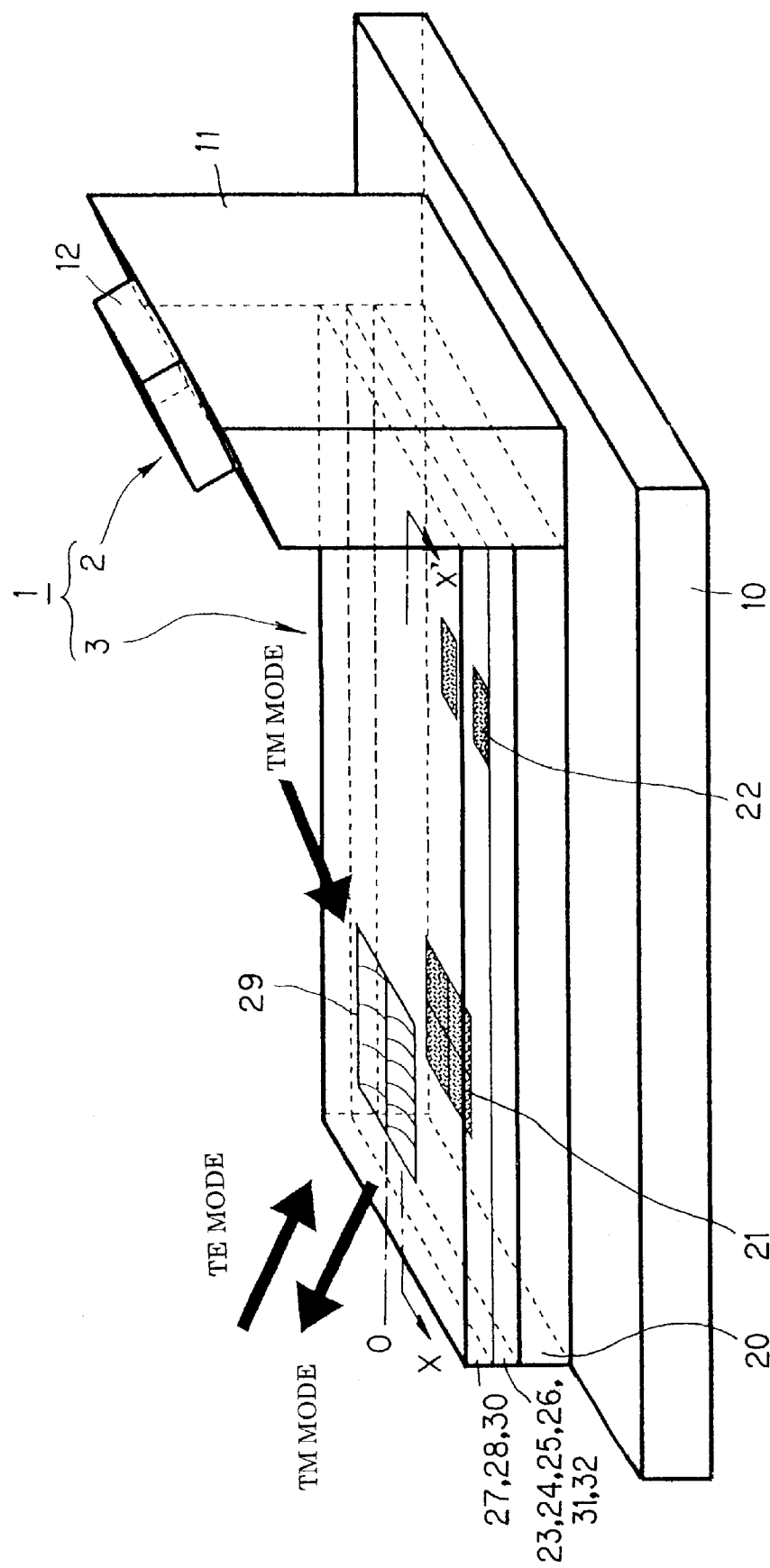
FIG. 1 is a perspective view showing a schematic configuration of an optical pickup device according to the first embodiment of present invention.

FIG. 1 is a perspective view showing a schematic configuration of the optical pickup device 1 according to the embodiment of the present invention. In FIG. 1, the optical pickup device 1 includes a semiconductor laser unit 2 having a semiconductor laser 12, and an optical integrated device 3 formed on a semiconductor substrate 20 in a laminated fashion. The semiconductor substrate 20 and a sub-mount 11 are bonded onto a mount base 10. The semiconductor laser 12 is positioned so as to emit a laser light with a predetermined angle with respect to the upper face of the optical integrated device 3.

Figure 2:
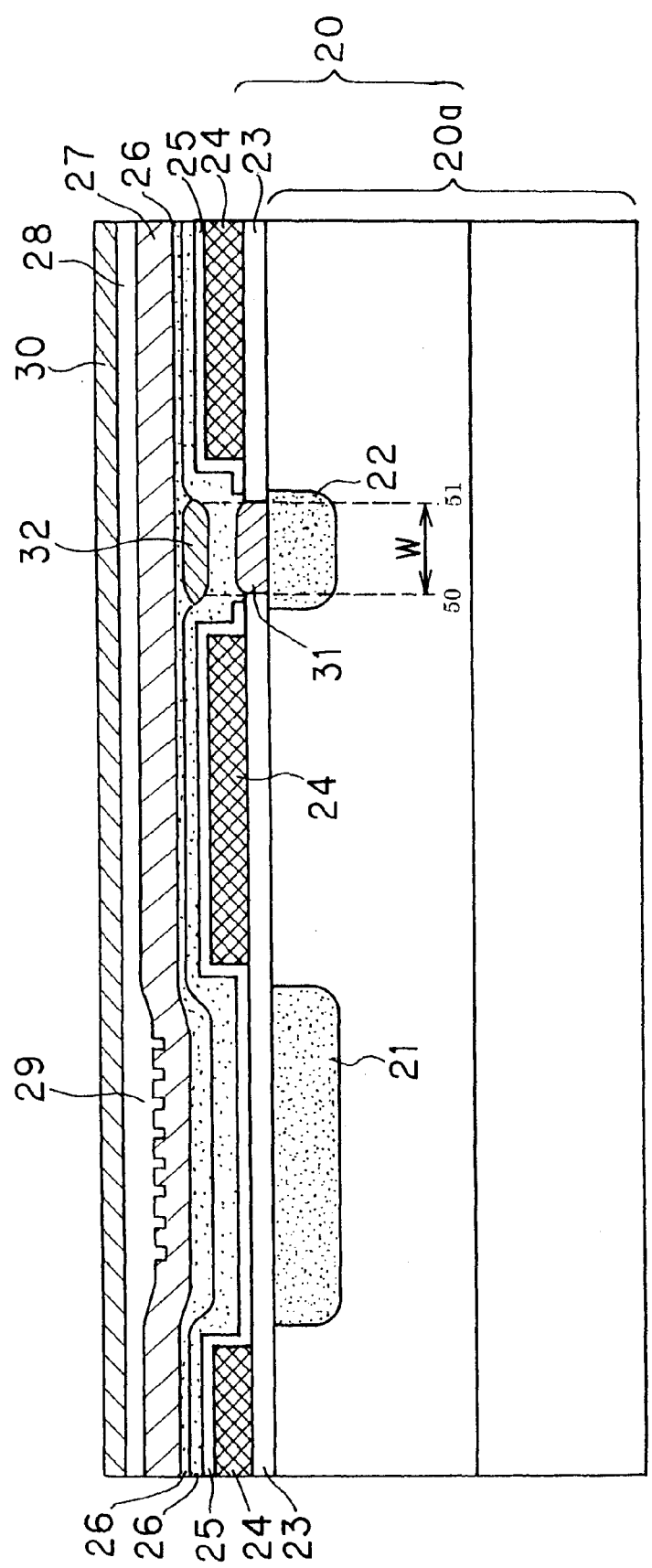
FIG. 2 is a sectional view showing the section at the line X–X' in FIG. 1.

As shown in FIG. 2 which is a sectional view of FIG. 1 at the line X–X', the optical integrated device 3 has an aluminum shielding layer 24, a protection layer 25, a SOG (Spin On Glass) layer 26 serving as a clad layer for absorbing or eliminating the level difference, an optical waveguide 27 formed on the SOG layer 26 for transmitting the laser light and propagating the laser light as the guided light, a grating 29 formed on the optical waveguide 27 for dividing the laser light into a transmissive light and a guided light, a SOG 28 formed on the grating 29, and a going-path/returning-path separation film 30 formed on the SOG layer 28. These layers are formed on the semiconductor substrate 20 in a laminated fashion. In the semiconductor substrate 20, the semiconductor substrate 20 on which a first light receiving portion 21 and a second light receiving layer 22a are formed is heat-processed to form a heat-oxidized film 23 on the surface of the semiconductor substrate 20a. At the upper position of the second light receiving portion 22, optical waveguides are formed in a multi-layer fashion. Specifically, the optical waveguide 31 of the lowermost layer, the optical waveguide 32 of the intermediate layer and the optical waveguide 27 of the uppermost layer are formed in a three-layer structure, with the SOG layers 26 being sandwiched therebetween.

The going-path/returning-path separation film 30, which is at the uppermost layer of the optical integrated device 3, is formed by a multi-layer film of dielectric, for example, and reflects the TM-mode laser light emitted by the semiconductor laser 1 and transmits the TE-mode returning light reflected by the optical disc and passed through the ¼-wavelength plate.

The grating 29 is formed by $TiO_2$ having thickness 0.10 $\mu$m, and constitutes a grating coupler together with the optical waveguide 27. The grating coupler transmits the major part of the TE-mode laser light transmitted through the going-path/returning-path separation film 30 downwardly, and propagates a part of the laser light through the optical waveguide 27 as the guided light. Thus, the grating coupler of the present invention is configured to input-couple the returning light from the optical disc to the optical waveguide 27, and hence the grating period is set to be no more than the laser light wavelength being used. In addition, the grating 29 of the present invention is divided into a left part and a right part with respect to the center line O along with the propagation direction of the guided light by the optical waveguide 27 as shown in FIG. 1, and the grating patterns of the left part and the right part are different from each other. The grating patterns of the left part and the right part are both curving, and the grating period is varied according to the position on the grating, i.e., so-called chirped grating.

The first light receiving portion 21 is a four-divided light receiving portion used to generate an RF signal and a tracking error signal, and is formed just below the grating 29 or slightly shifted from the position just below the grating 29. The second light receiving portion 22 is a two-divided light receiving portion used to generate a focus error signal, and is formed remotely from the grating 29 so as to ensure sufficient light path length.

Out of the three-layer optical waveguides, the optical waveguide 27 of the uppermost layer is made of $SiO_2$. The SOG layer 28 is formed on the optical waveguide 27, and the SOG layer 26 is formed under the optical waveguide 27. The refractive indexes of those layers satisfy the following condition:

(Waveguide 27)>(SOG layer 28), (Waveguide 27)>(SOG layer 26), (SOG layer 28)=(SOG layer 26).

Further, the film thicknesses satisfy the following condition:

(Waveguide 27)>(SOG layer 26).

Thus, the optical waveguide 27 has the refractive index higher than those of its upper and lower layers and is formed to have a predetermined film thickness, thereby satisfying a predetermined guiding condition to allow the guided light input-coupled by the grating 29 to be propagated in the guided mode.

Further, as shown in FIG. 2, the optical waveguide 32 of the intermediate layer is formed under the optical waveguide 27 of the uppermost layer with the SOG layer 26 being sandwiched therebetween, and the optical waveguide 31 of the lowermost layer is formed under the optical waveguide 32 of the intermediate layer with the SOG layer 26 being sandwiched therebetween. Further, the second light receiving portion 22 is formed under the optical waveguide 31.

The refractive indexes of the optical waveguide 32 of the intermediate layer, the optical waveguide 31 of the lowermost layer and layers around them satisfy the following condition:

(Waveguide 32)>(SOG layers 26 over/under waveguide 32)

(Waveguide 31)>(SOG layer 26).

In addition, the film thicknesses satisfy the following condition:

(Waveguide 31)>(SOG layer 26).

Thus, the refractive indexes of the optical waveguide 32 of the intermediate layer and the optical waveguide 31 of the lowermost layer are set to be higher than those of the layers around them, and the waveguides 32 and 31 are formed to have predetermined film thicknesses. This satisfies a predetermined guiding condition, thereby enabling propagation of the guided light in the guiding mode.

Considering the relation between the layers from the optical waveguide 27 of the uppermost layer to the optical waveguide 31 of the lowermost layer, the film thicknesses satisfy the following condition:

(Waveguide 27)>(SOG layer 26 under waveguide 27), (Waveguide 27)>(Waveguide 32), (Waveguide 27)>(SOG layer 26 under waveguide 32), (Waveguide 31)>(SOG layer 26 under waveguide 27), (Waveguide 31)>(Waveguide 32), and (Waveguide 31)>(SOG layer 26 under waveguide 32).

The refractive indexes satisfy the following condition:

(Waveguide 27)=(Waveguide 32)=(Waveguide 31), and (SOG layer 26 under waveguide 27)=(SOG layer 26 under waveguide 32).

Generally, as shown in FIG. 3A, if two waveguides are positioned sufficiently remotely from each other, each waveguide is independent and the guided light propagates through the waveguide with its own field distribution and propagation constant. However, as shown in FIG. 3B, if two waveguides are positioned closely to each other, the whole system including both waveguides functions as a single waveguide and the light wave power moves between the waveguides.

In order to apply this phenomenon to the optical integrated device for the optical pickup, the present invention forms the optical waveguide laminated structure including multiple waveguides with the SOG layers 26 being sandwiched therebetween, and the respective layers have the above-mentioned relation. Thus, the whole system including three optical waveguides functions like a single optical waveguide and the light wave power moves between two adjacent optical waveguides.

Namely, the light wave power propagating through the optical waveguide 27 of the uppermost layer shifts to the optical waveguide 32 of the intermediate layer and propagates through the optical waveguide 32. The light wave power propagating through the optical waveguide 32 of the intermediate layer shifts back to the optical waveguide 27 of the uppermost layer and propagates through the optical waveguide 27. This shifting is repeated. In addition, the light wave power propagating through the optical waveguide 32 of the intermediate layer shifts to the optical waveguide 31 of the lowermost layer and propagates through the optical waveguide 31. The light wave power propagating through the optical waveguide 31 of the lowermost layer shifts back to the optical waveguide 32 of the intermediate layer and propagates through the optical waveguide 32. This shifting is repeated.

When the light wave repeatedly shifts between the optical waveguides of multiple layers closely provided, the light wave gradually shifts to the optical waveguide of the lower layer side, and the guided light propagates through all optical waveguides. By the phase matching with the substrate, the optical waveguide 31 of the lowermost layer becomes radiation mode to radiate the guided light.

In this embodiment, the multiple layers have the above-mentioned film thickness relation, and the film thickness of the optical waveguide of the intermediate layer is formed to be thinner than the film thicknesses of the optical waveguides of the uppermost and the lowermost layers. Further, all optical waveguides have the same refractive indexes and all SOG layers 26 have the same refractive indexes. Therefore, the guided light may be efficiently radiated to the second light receiving portion 22.

Figure 4:
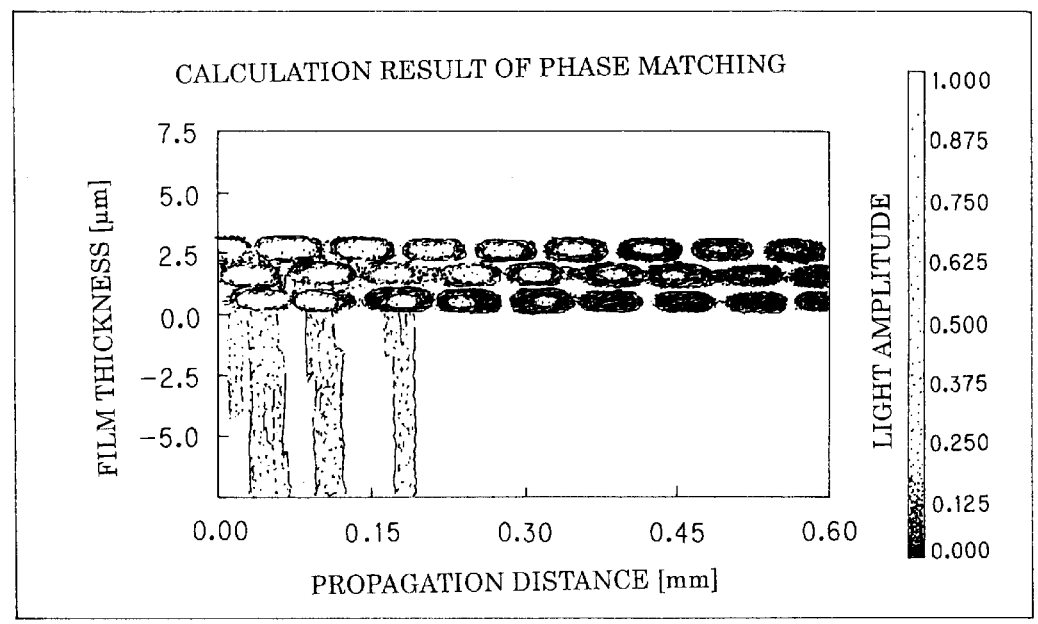
FIG. 4 is a graph showing the light intensity change with respect to the propagating distance in the optical waveguide on the second light receiving portion of the optical pickup device shown in FIG. 1.
Figure 5:
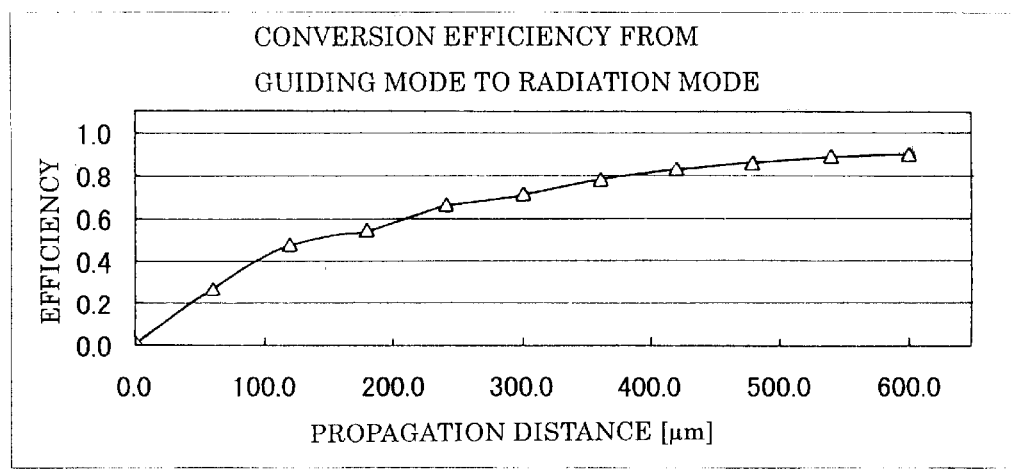
FIG. 5 is a graph showing the variation of the conversion efficiency from the guided mode to the radiation mode with respect to the propagating distance in the optical waveguide on the second light receiving portion of the optical pickup shown in FIG. 1.
Figure 6:
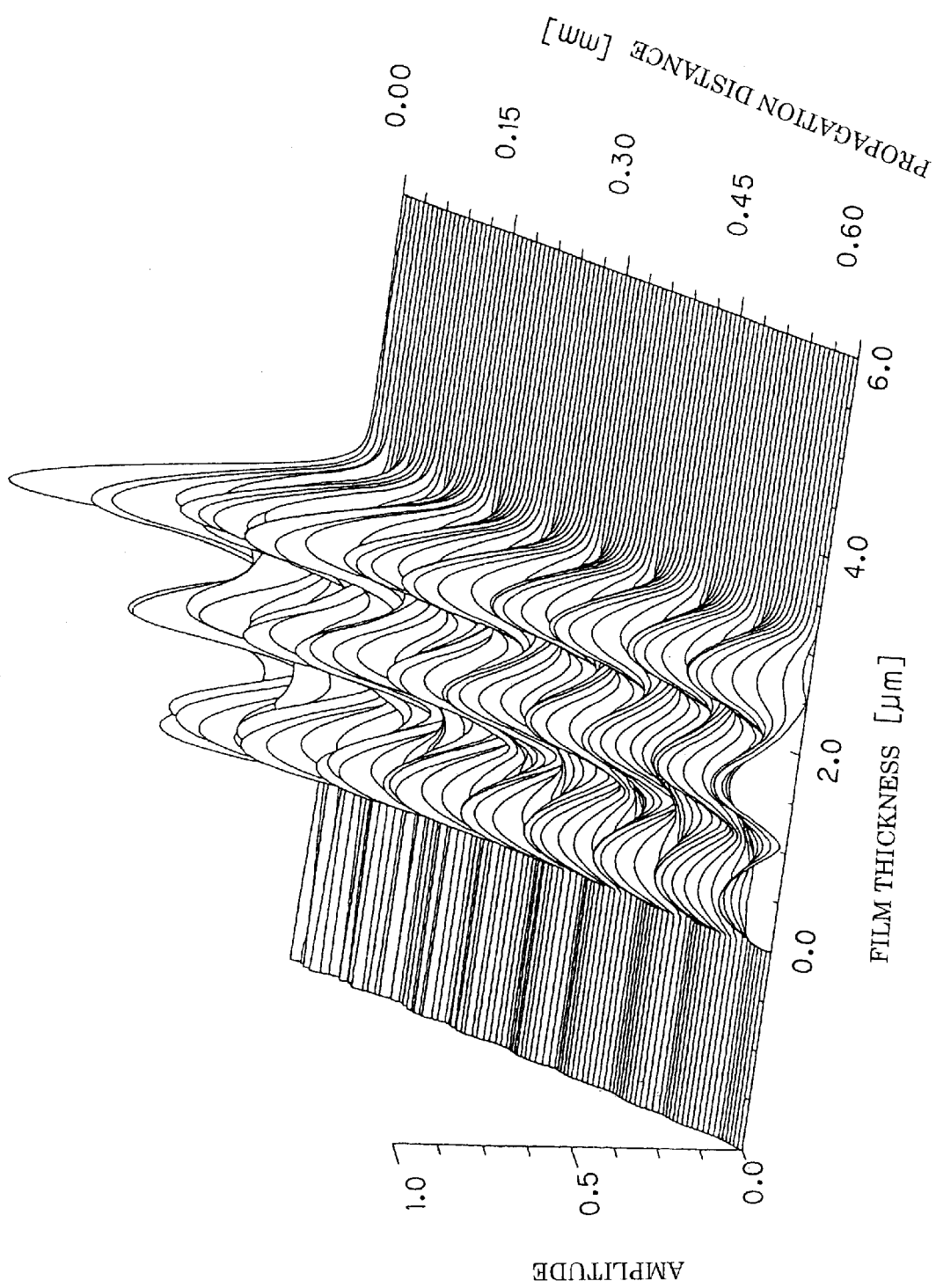
FIG. 6 is a graph showing the amplitude variation of light intensity with respect to the propagating distance in the optical waveguide on the second light receiving portion of the optical pickup shown in FIG. 1.

The simulation result of the TE-mode laser light in the optical waveguide at the position over the second light receiving portion 22 is shown in FIGS. 4 to 6. FIG. 4 shows the calculation result of the light amplitude variation in the optical waveguide, wherein the abscissa represents the propagation distance in the optical waveguide and the ordinate represents the film thickness. As shown in FIG. 2, the propagation distance in FIG. 4 indicates the propagation distance within the area of the length W from one edge 50 (0.00 mm) to the opposite edge 51 (0.60 mm). The ordinate is set to the film thickness in order to indicates the position of each layers within the area of the length W. The area less than 0.0 µm indicates the position where the second light receiving portion is formed on the semiconductor substrate 20, and the area from 0.0 µm to approximately 3.0 µm indicates the position in the optical waveguide 31 of the lowermost layer, the SOG layer 26, the optical waveguide 32 of the intermediate layer, the SOG layer 26 and the optical waveguide 27 of the uppermost layer. Also, in FIG. 4, the light amplitude is indicated by the brightness, and the light amplitude is determined such that the light amplitude in the optical waveguide 27 of the uppermost layer at the position of propagation distance 0.00 mm is equal to 1.00.

As seen from FIG. 4, in the area where the propagation distance is less than approximately 0.15 mm, the light brightness in the optical waveguide 27 of the uppermost layer, the optical waveguide 32 of intermediate layer and the optical waveguide 31 of the lowermost layer are within the range of approximately 0.600 to 1.000, and the power shifting phenomenon of the light wave between the multilayer optical waveguides is taking place. In each optical waveguide, the light amplitude decreases as the propagation distance increases. The light amplitude, which is 1.000 at the position of the propagation distance 0.00 mm within the optical waveguide 27 of the uppermost layer, is reduced to approximately 0.100 at the position of the propagation distance 0.60 mm in the optical waveguide 32 of the lowermost layer. This is because the radiation to the second light receiving portion 22 took place while the light propagates through each waveguide with shifting. The conversion efficiency from the guiding mode to the radiation mode is approximately 90% because the amplitude expressed by 1.000 is reduced to the amplitude expressed by 0.100.

Next, FIG. 5 shows the relation between the propagation distance and the conversion efficiency based on the calculation result shown in FIG. 4, wherein the abscissa represents the propagation distance and the ordinate represents the conversion efficiency from the guiding mode to the radiation mode. As seen in FIG. 5, the conversion efficiency increases as the propagation distance increases, and reaches approximately 90% at the position of 6.00 µm.

Next, FIG. 6 shows the calculation result of FIG. 5 in a three-dimensional graph, wherein the light intensity is indicated by the amplitude of the waveform. In FIG. 6, the border between the surface of the second light receiving portion 22 and the optical waveguide 31 of the lowermost layer is set to the film thickness zero position. The position from the optical waveguide 31 of the lowermost layer to the optical waveguide 27 of the uppermost layer is represented by positive value, and the position on the semiconductor substrate 20 side is represented by negative value.

As seen from FIG. 6, the amplitude, which is 1.0 at the position of the edge 50 (0.00 mm) in the optical waveguide 27 of the uppermost layer, gradually decreases as it approaches the edge 51 side and becomes about 0.1 at the position of the edge 51 (0.60) in the optical waveguide 32 of the lowermost layer. Thus, according to the configuration of the present invention, the conversion from the guiding mode to the radiation mode can be achieved with the conversion efficiency of 90%.

Figure 7:
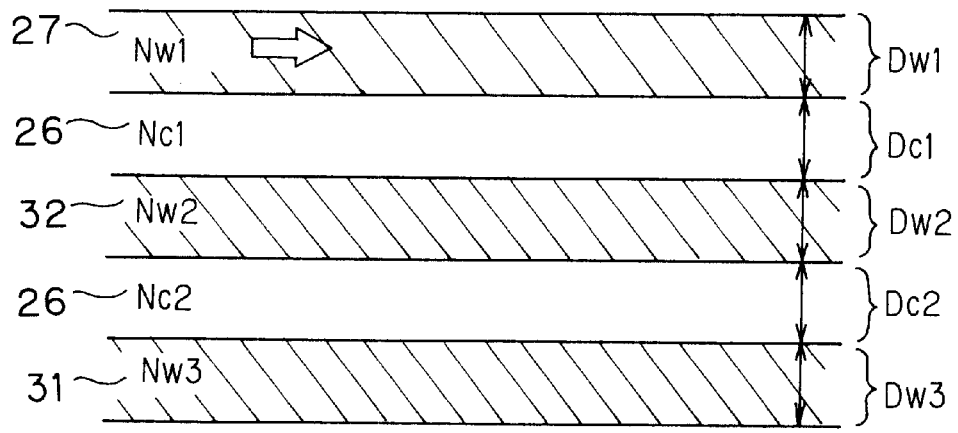
FIG. 7 is an explanatory view showing the relation of the film thicknesses and the refractive indexes of optical waveguides and SOG layers on the second light receiving portion of the optical pickup shown in FIG. 1.
Figure 8:
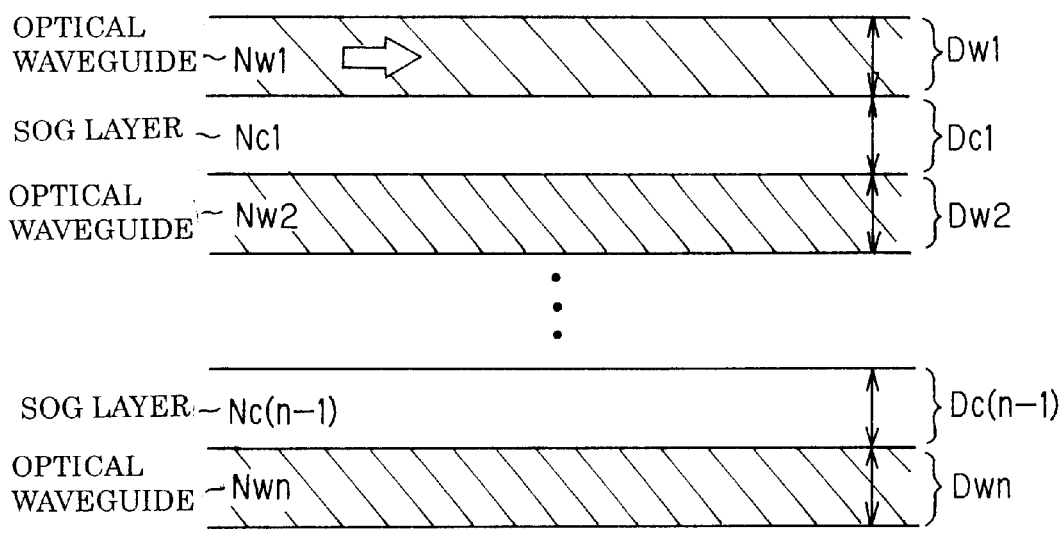
FIG. 8 is an explanatory view showing the relation of the film thicknesses and the refractive indexes when the optical waveguide on the second light receiving portion has n layers.

Next, the description will be given of the analysis result of the relation between the film thickness and the refractive index of each optical waveguide and the SOG layer 26 against the conversion efficiency from the guiding mode to the radiation mode with reference to FIGS. 7 and 8. In this analysis, as shown in FIG. 7, the simulation similar to that already described with reference to FIGS. 4 to 6 is performed, with varying the film thickness Dw1 of the optical waveguide 27 of the uppermost layer, the film thickness Dw2 of the optical waveguide 32 of the intermediate layer, the film thickness Dw3 of the optical waveguide 31 of the lowermost layer, the layer thickness Dc1 of the SOG layer 26 sandwiched by the optical waveguides 27 and 32, and the layer thickness Dc2 of the SOG layer 26 sandwiched by the optical waveguides 32 and 31. Similarly, the simulation similar to that already described with reference to FIGS. 4 to 6 is performed, with varying the refractive index Nw1 of the optical waveguide 27 of the uppermost layer, the refractive index Nw2 of the optical waveguide 32 of the intermediate layer, the refractive index Nw3 of optical waveguide 31 in the lowermost layer, the refractive index Nc1 of the SOG layer 26 sandwiched by the optical waveguides 27 and 32, and the refrative index Nc2 of the SOG layer 26 sandwiched by the optical waveguides 32 and 31. As a result, the highest phase matching efficiency is achieved when the following condition is satisfied:

$$Dw1>Dc1, Dw1>Dw2, Dw1>Dc2,$$

and $$Dw3>Dc1, Dw3>Dw2, Dw3>Dc2.$$

With respect to the refractive index, it is necessary that the condition:

$$Nw1=Nw2=Nw3, \text{ and } Nc1=Nc2=Nc3$$

is satisfied, in order to achieve the above-mentioned high efficiency. It is found that if the refractive indexes do not satisfy this condition, the efficiency is greatly deteriorated even if the above film thickness condition is satisfied.

When the similar analysis is performed with increasing the number of the optical waveguides and the SOG layers, it is found the phase matching efficiency may be improved, regardless of the number of the waveguides and the SOG layers, if the above film thickness condition and the refractive index condition are satisfied. In other words, if n optical waveguides and n-1 SOG layers are provided, the phase matching efficiency may be improved if the film thicknesses satisfy the condition:

$$Dw1>Dc1, Dw1>Dw2, \ldots, Dw1>Dc(n-1),$$

and $$Dwn>Dc1, Dwn>Dw2, \ldots, Dwn>Dc(n-1),$$

and refractive indexes satisfy the condition:

$$Nw1=Nw2=\ldots=Nwn,$$

and $$Nc1=Nc2=\ldots=Nc(n-1).$$

It is noted that this embodiment is configured to propagate the TE-mode laser light as the guided light, and the result shown in FIGS. 4 to 6 and the analysis result are derived for the TE-mode laser light. However, the above description may be applied to the configuration which propagates the TM-mode laser light as the guided light.

(ii) Optical Integrated Device Manufacturing Method

Next, the description will be given of the manufacturing method of the optical integrated device 3 according to this embodiment. In this embodiment, first, heat processing is applied to the surface of the semiconductor substrate 20a to form heat-oxidized $SiO_2$ film 23 thereon, and the aluminum light-shielding film 24 and $SiO_2$ protection film 25 are laminated. Thus, the photodetector, in which the first light receiving portion 21 and the second light receiving portion 22 are formed on the same surface of the semiconductor substrate 20, is produced. In place of the photodetector, OEIC (Opto-Electronic-Integrated Circuit (photodetector with amplifier)) may be used. This photodetector or the OEIC has the same configuration as those generally used in a reproduction apparatus for CD, LVD, DVD and so on, and can be produced by changing the pattern, without changing process. Therefore, an existing apparatus may be used for the manufacturing.

Figure 9:
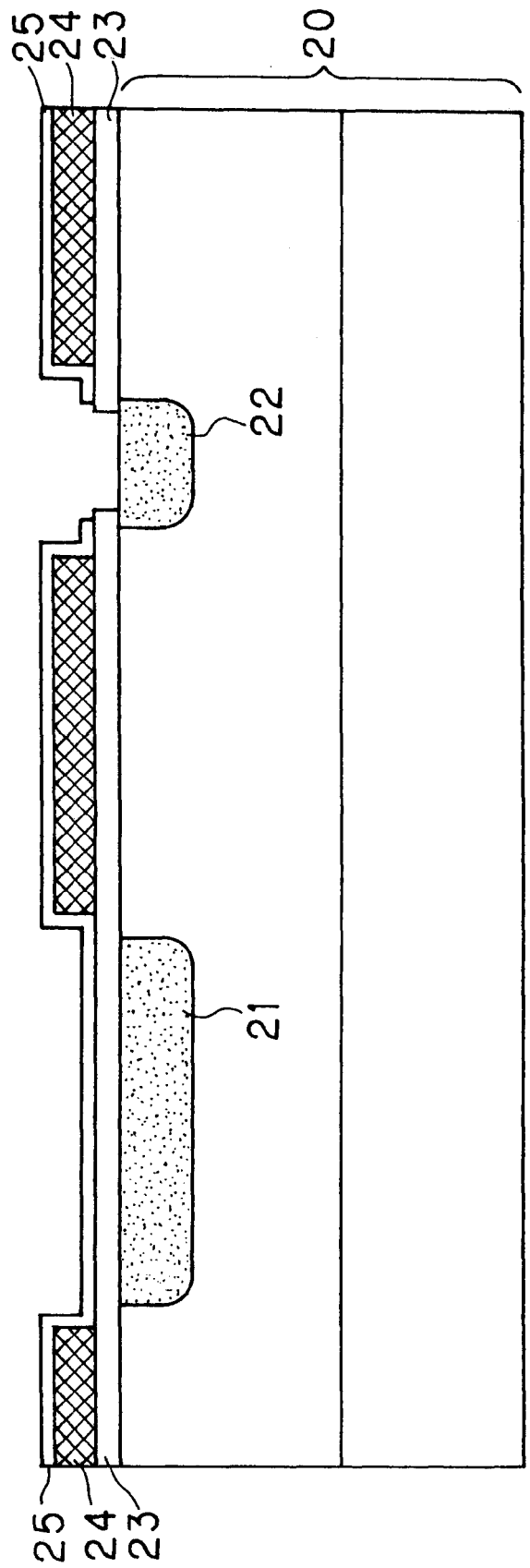
FIGS. 9 to 15 are diagrams showing the manufacturing steps of the optical integrated device shown in FIG. 1.

Then, as shown in FIG. 9, the area other than the second light receiving portion 22 is masked to remove the head oxidized film 23 and the protection film 25 on the second light receiving portion 22 by etching. By this process, the block or obstacle between the optical waveguide 31 of the lowermost layer and the second light receiving portion 22 is removed, so that the light radiated from the optical waveguide 31 of the lowermost layer may be efficiently received by the second light receiving portion 22.

Figure 10:
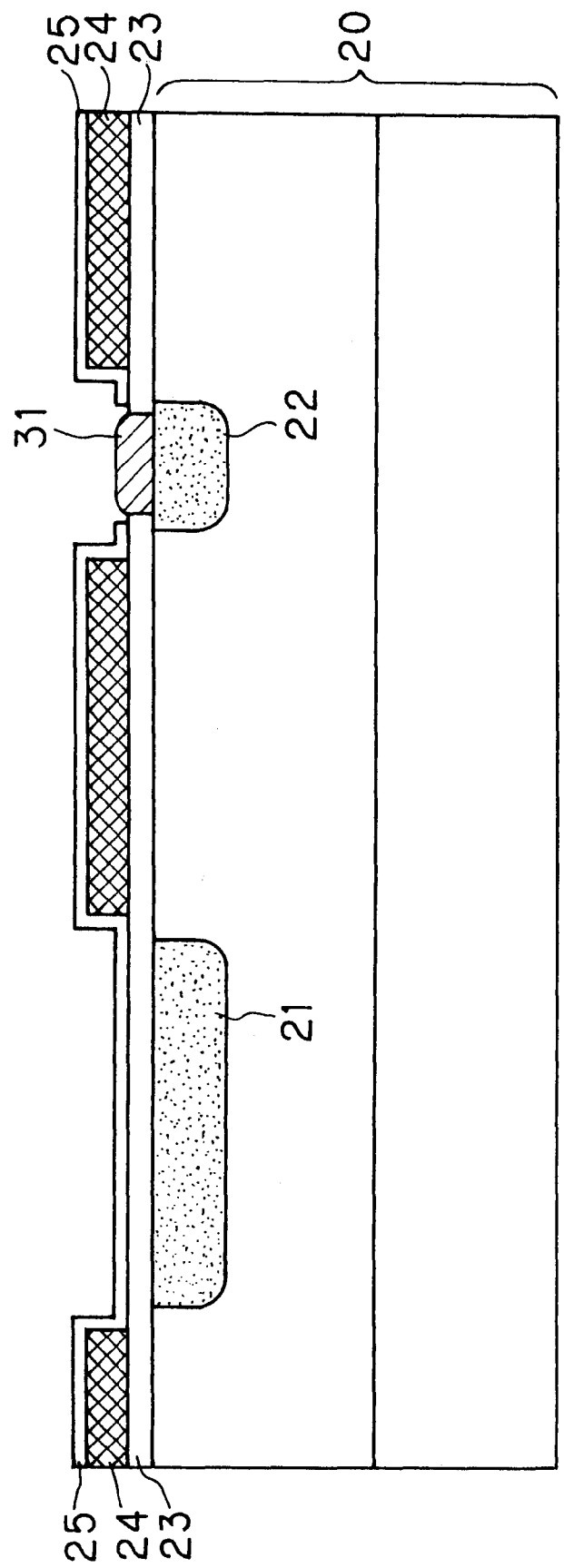

Then, the area other than the second light receiving portion 22 is masked again to bury the optical waveguide 31 of the lowermost layer made of $SiO_2$ by sputtering or the like as shown in FIG. 10. In this step, the film thickness of the optical waveguide 31 of the lowermost layer is adjusted to be thicker than the film thickness of other optical waveguides.

Figure 11:
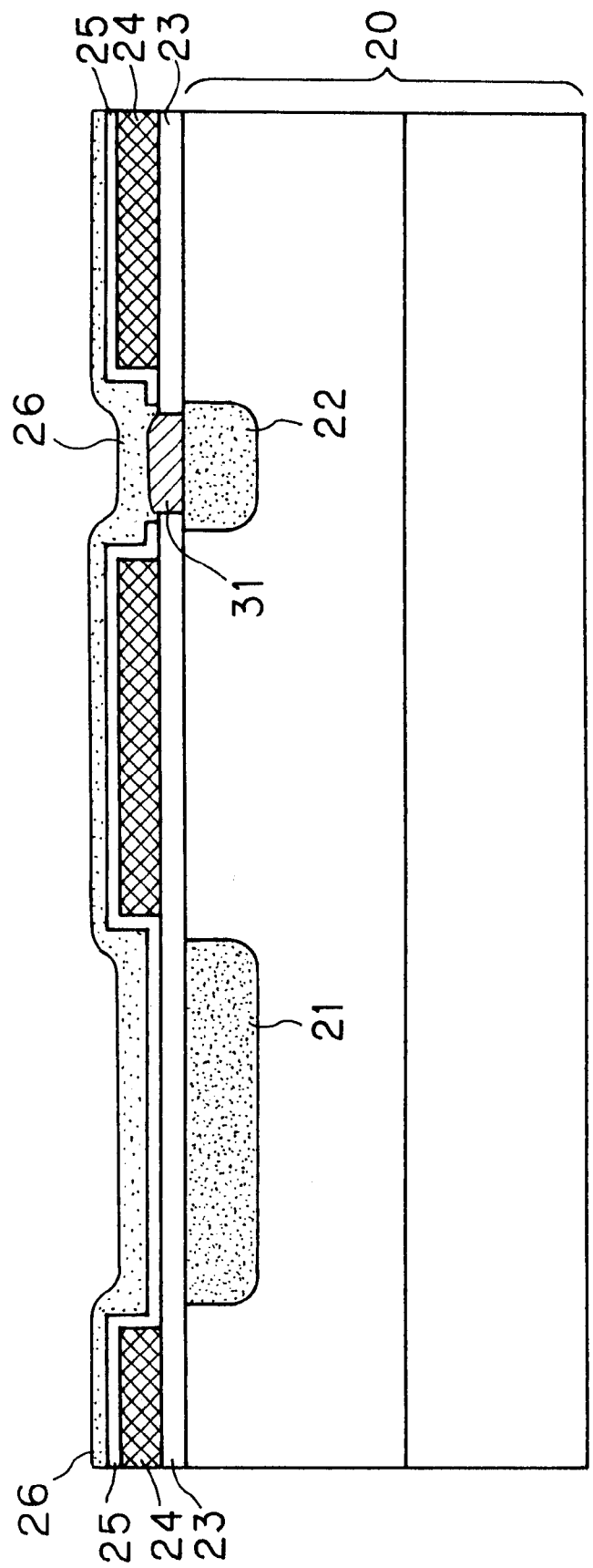

The photodetector or OEIC described above is formed with the aluminum wiring and/or aluminum light- shielding film 24 which creates level difference with respect to the optical waveguide 31 of the lowermost layer. In order to fill this level difference, the SOG layer 26 is coated (deposited) by spin coating, as shown in FIG. 11. This SOG layer 26 absorbs or eliminates the level difference and adjusts the distance between the optical waveguide 31 of the lowermost layer and the optical waveguide 32 of the intermediate layer.

Figure 12:
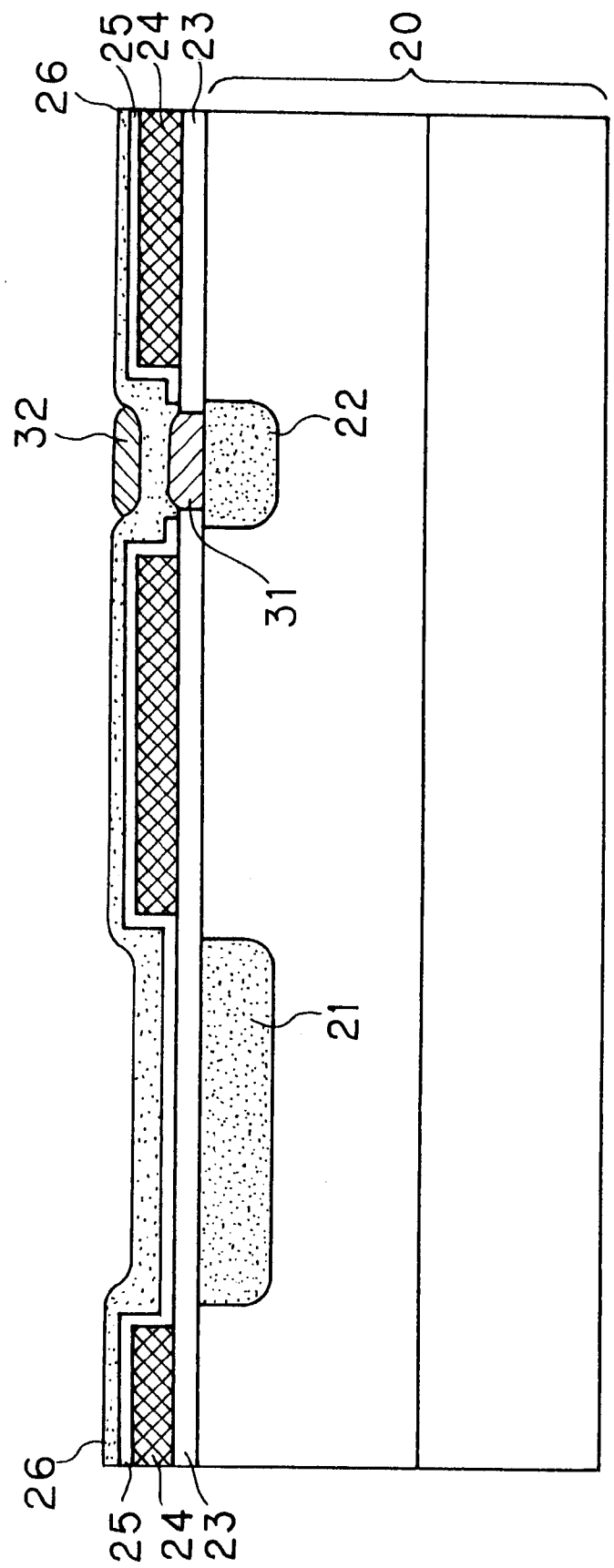

Then, the area other than the optical waveguide 31 of the lowermost layer is again masked, and the optical waveguide 32 of the intermediate layer made of $SiO_2$ is buried by the sputtering or the like, as shown in FIG. 12. In this step, the film thickness of the optical waveguide 32 of the intermediate layer is adjusted to be thinner than the film thicknesses of other optical waveguides.

Figure 13:
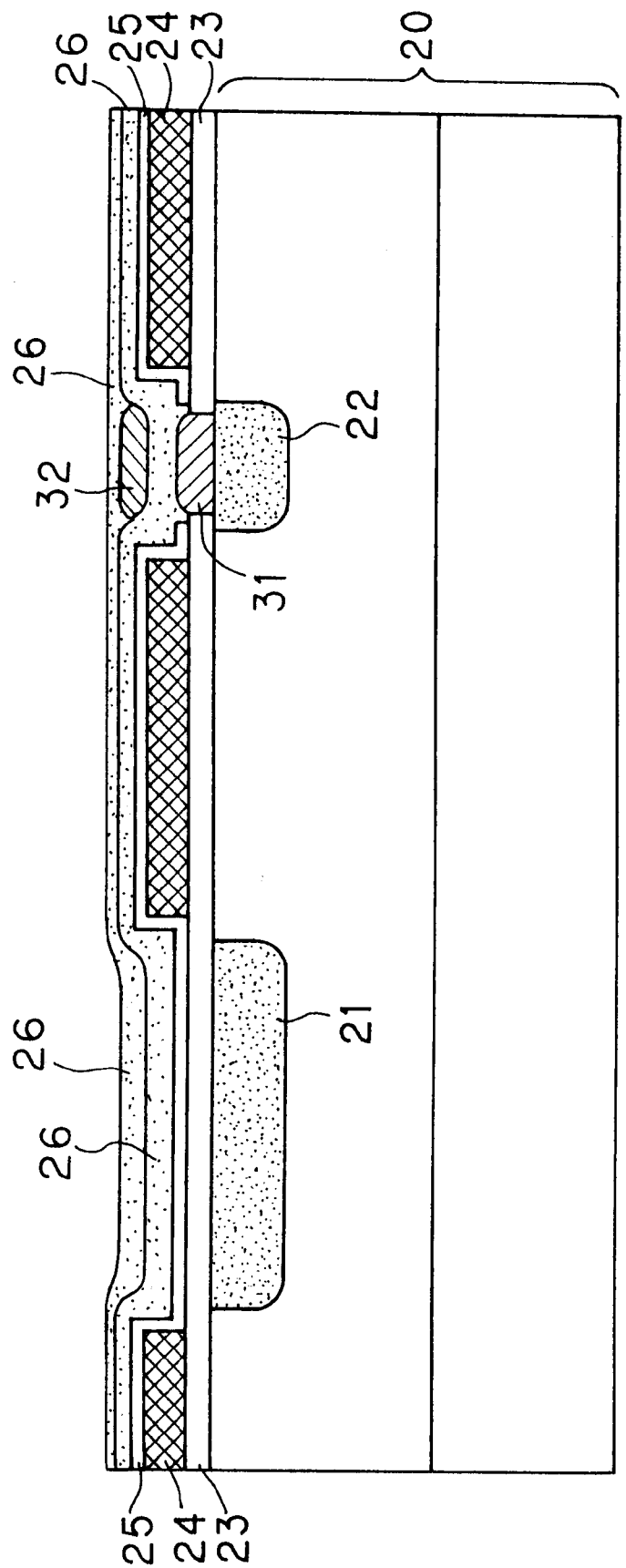

Then, in order to absorb the level difference around the optical waveguide 32 of the intermediate layer, the SOG layer 26 is coated (deposited) by spin coating, as shown in FIG. 13. This SOG layer 26 absorbs the level difference, and adjusts the distance between the optical waveguide 32 of the intermediate layer and the optical waveguide 27 of the uppermost layer.

Figure 14:
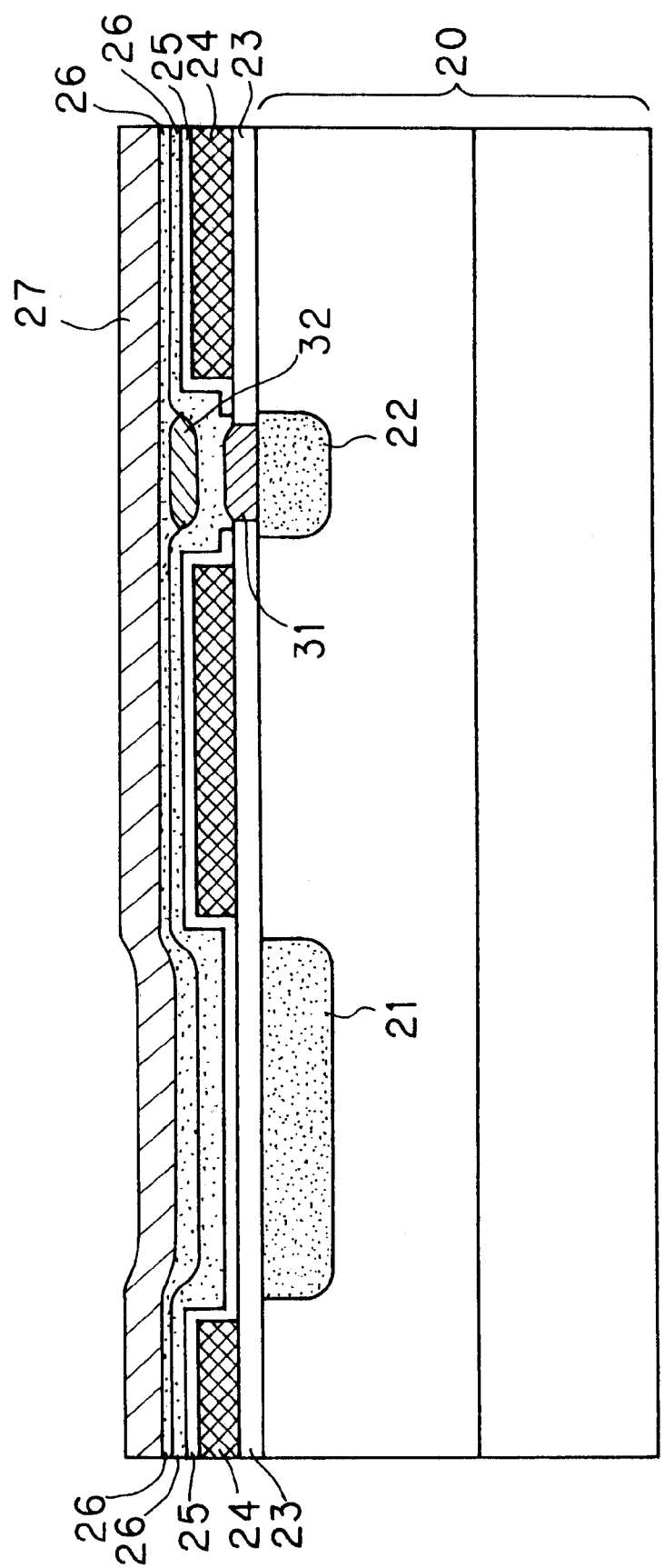

Then, as shown in FIG. 14, the optical waveguide 27 of the uppermost layer made of $SiO_2$ is formed on the SOG layer 26 by sputtering. In this step, the optical waveguide 27 is formed to have a film thickness which is thicker than the film thickness of the optical waveguide 31 of the intermediate layer and thinner than the film thickness of the optical waveguide 31 of the lowermost layer.

Figure 15:
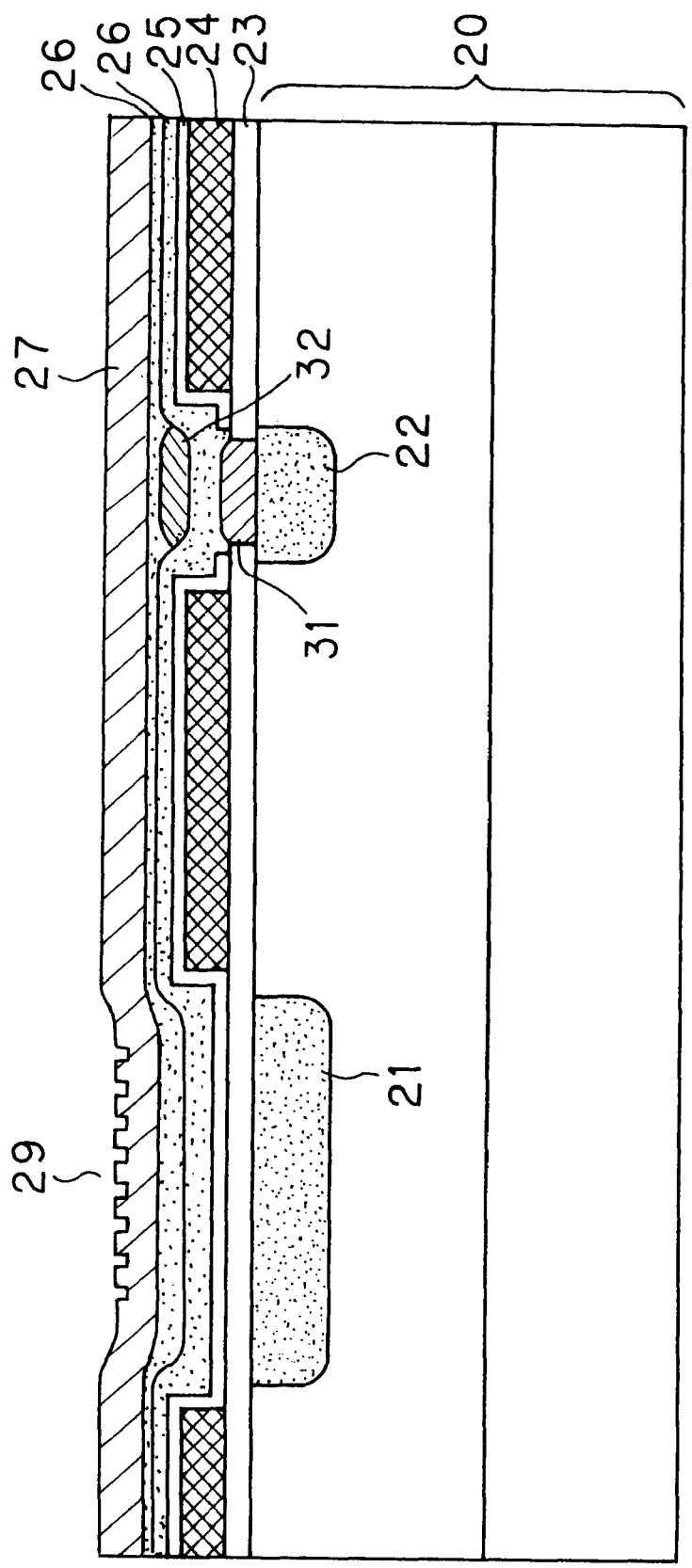

Then, as shown in FIG. 15, the grating coupler having an optical element function is formed on the optical waveguide 27 of the uppermost layer by etching or lift-off. The position of the grating 29 is just above the first light receiving portion 21 or at the position slightly shifted in the direction opposite to the propagation direction from the position just above the first light receiving portion 21. The grating coupler is easier to produce in such a configuration that the transmissive light quantity is larger than the guided light quantity, and this embodiment has such a configuration. Therefore, by placing the light receiving portion at the position where more transmissive light is efficiently received than the guided light, the RF signal important for the signal reproduction may be appropriately generated. At the same time, the tracking error signal may be appropriately generated.

After forming the grating 29, it is buried by the SOG layer 28. In order to effectively achieve the input-coupling by the buried grating, it is desired that the refractive indexes of the elements have the following relation:

$$\text{SOG layer 28} \leq \text{Optical waveguide 27} < \text{Grating 29}$$

After burying the SOG layer 28, the surface is polished to create a surface having an appropriate surface accuracy, and then the going-path/returning-path separation film 30 is deposited. The material of each layer is as follows:

Going-path/returning-path separation film 30: dielectric multi-layer film,

SOG layer 28: SOG

Grating : $SiO_2$

Optical waveguide 27 of the uppermost layer: $SiO_2$

SOG layer 26: SOG

Optical waveguide 32 of the uppermost layer: $SO_2$

SOG layer 26: SOG

Optical waveguide 31 of the lowermost layer: $SiO_2$

As described above, the optical integrated device of this embodiment may use a general photodetector or OEIC and normal laminating or depositing process, thereby enabling easy manufacturing. In addition, since existing manufacturing apparatus may be used, the manufacturing cost may be reduced.

(iii) Operation of Optical Pickup Device

Figure 16:
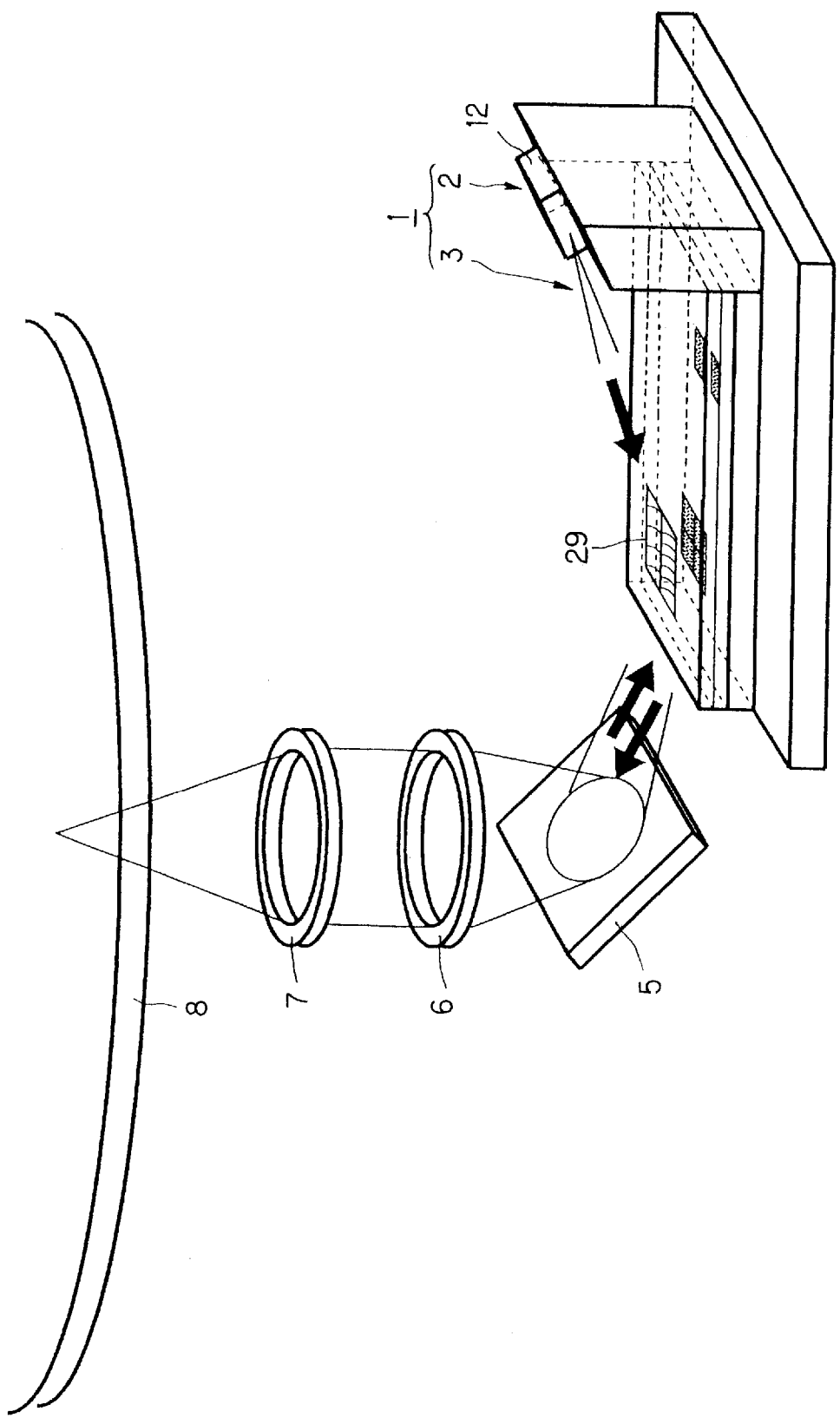
FIG. 16 is a diagram showing whole configuration of the optical system, including an optical disc, employing the optical pickup according to the first embodiment.
Figure 17:
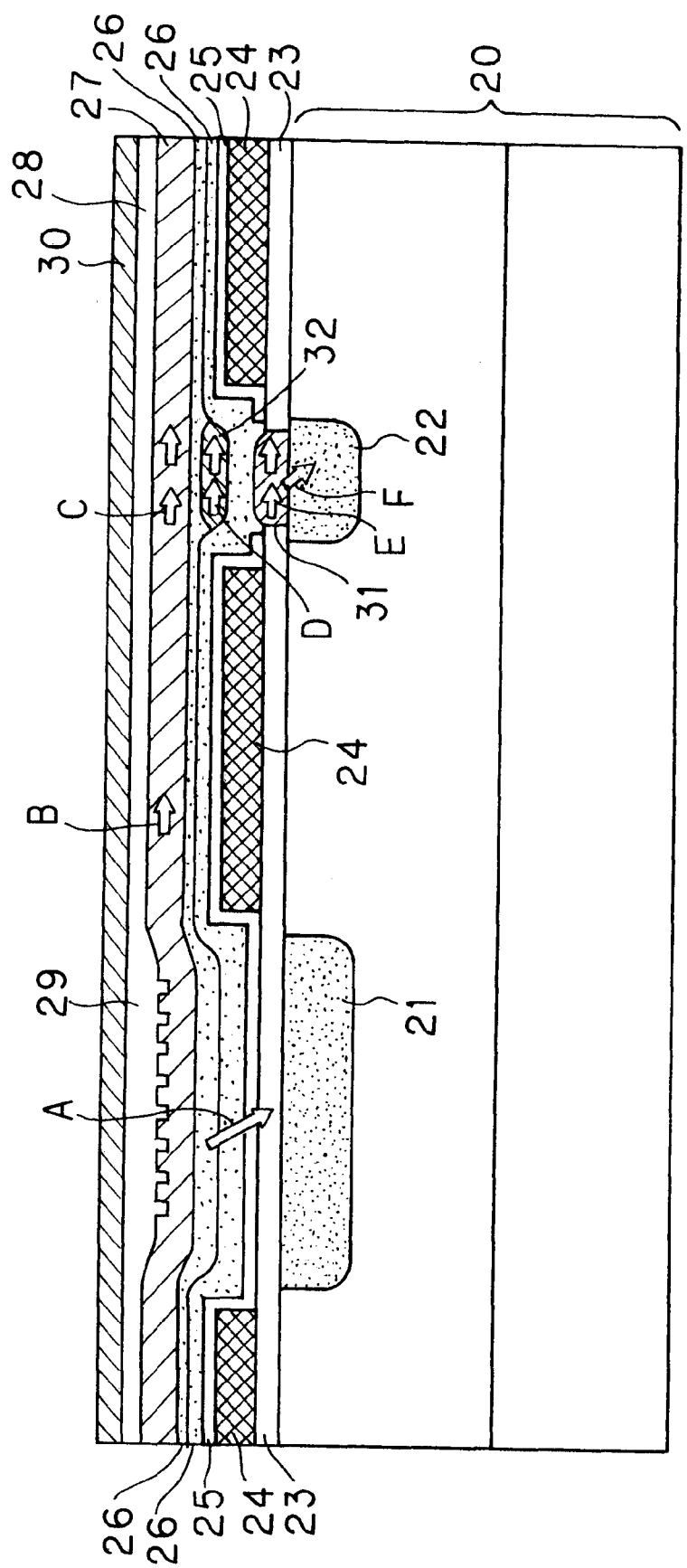
FIG. 17 is a sectional view showing the operation of the optical pickup device according to the first embodiment.

Next, the operation of the optical pickup device 1 of this embodiment described above will be described with reference to FIGS. 16 to 18. FIG. 16 is a diagram showing the whole configuration of the optical system of the optical pickup including the optical disc, and FIG. 17 is a sectional view similar to FIG. 2. FIGS. 18A to 18C are diagrams showing the positional relation of the grating and the second light receiving portion 22, and FIGS. 18D to 18F show the laser light focusing state, viewing the optical integrated device 3 from above in FIG. 16.

The laser light emitted by the semiconductor laser 12 is directed to the grating 29 of the optical integrated device 3 with a predetermined angle. Since the optical integrated device 3 has the going-path/returning-path separation film 30 at its uppermost layer, only the TM-mode laser light is reflected by the polarization beam splitter effect or the half-mirror effect of the going-path/returning-path separation film 30, and is irradiated onto the reflective mirror 5 as shown in FIG. 16. This TM-mode laser light is reflected by the reflective mirror 5, is changed into parallel light by the collimator lens 6, is irradiated on the objective lens 7 via a ¼-wavelength plate (not shown), and focused on the information recording surface of the optical disc 8 by the objective lens 7.

Then, the returning light reflected by the information recording surface of the optical disc 8 is again incident upon the going-path/returning-path separation film 30 via the reverse path. Since the returning light is TE-mode, the going-path/returning-path separation film 30 transmits this TE-mode laser light if the going-path/returning-path separation film 30 is made of dielectric multi-layer film. The transmitted laser light is irradiated on the grating 29, and divided into the transmissive light represented by the arrow A and the guided light represented by the arrow B in FIG. 17 by means of the grating coupler constituted by the grating 29 and the optical waveguide 27. A major part of the returning light becomes the transmissive light and is received by the first light receiving portion 21 positioned just below the grating 29 or around the position just below the grating 29. In this embodiment, the first light receiving portion 21 is a four-divided light receiving portion, and an RF signal is produced from the output by the first light receiving portion 21. In addition, a tracking error signal is produced from the output of the first light receiving portion 21 by the phase difference method or the push-pull method.

On the other hand, at the upper position of the second light receiving portion 22, the optical waveguides 27, 32, 31 are formed in a closely positioned three-layer structure with the SOG layers 26 being sandwiched therebetween. Thus, the guided light propagating the optical waveguide 27 of the uppermost layer represented by the arrow C shifts to the optical waveguide 32 of the intermediate layer, and the light wave power shifts between the optical waveguide 27 of the uppermost layer and the optical waveguide layer 32 of the intermediate layer. As a result, the guided light also propagates through the optical waveguide 32 of the intermediate layer as indicated by the arrow D. Further, the guided light propagating through the optical waveguide 32 of the intermediate layer represented by the arrow D also shifts to the optical waveguide 31 of the lowermost layer, and the light wave power shifts between the optical waveguide 32 of the intermediate layer and the optical waveguide 31 of the lowermost layer. As a result, the guided light propagates through the optical waveguide 31 of the lowermost layer as indicated by the arrow E. The guided light propagating through the optical waveguide of the lowermost layer is radiated onto the second light receiving portion 22 by the phase matching as indicated by the arrow F. The radiated light is converged on the light receiving portion A and B of the second light receiving portion 22 as shown in FIGS. 18A to 18C.

In this embodiment, as described above, the grating 29 has different patterns on its left portion and right portion. Specifically, as shown in FIG. 18B, even if the laser light is incident upon the left and the right portions of the grating 29 in a symmetric manner, one of the left and the right portion has a focal distance f1 to create the focal point before the light receiving portion A, while the other one has a focal distance f2 to create the focal point behind the light receiving portion B. Therefore, the focal point of the laser light on the optical disc 8 moves according to the up/down movement of the objective lens. If the laser light shifts as shown in FIGS. 18A or 18C, the light spot areas on the light receiving portions A and B change as shown in FIGS. 18D and 18F. The variation of the output from the light receiving portions due to this area change is calculated by the arithmetic operation using the amplifiers 40 to 42 as shown in FIG. 18F to produce a focus error signal. Thus, in this embodiment, the focus error signal may be produced by the reliable beam-size method (Foucault method). Further, this embodiment has a configuration to change the propagation mode of the guided light in the optical waveguide 27 to the radiation mode and detects it by the second light receiving portion 22, and hence the received light quantity by the second light receiving portion 22 may be adjusted by the size (coupling length) of the second light receiving portion 22 or the thicknesses of the SOG layers 26 and the three optical waveguides.

While it is not shown in the figures, the optical pickup of this embodiment has a light receiving unit for monitoring the semiconductor laser. Based on the monitoring signal by this light receiving unit, the semiconductor laser power is monitored and the power is always adjusted appropriately. For example, the light input to this light receiving may be achieved by reflecting the light from the backside of the chip by a reflective mirror.

As described above, in this embodiment, the grating coupler is used to divide the returning light from the optical disc 8 into the transmissive light and the guided light, and the first light receiving portion 21, which is four-divided light receiving portion, is positioned just below the grating 29 or around the position just below the grating 29 to receive large quantity transmissive light. Therefore, the first light receiving portion 21 can receive sufficient light quantity, and the RF signal and the tracking error signal may be appropriately generated. Particularly, compared with the conventional method of generating the RF signal using the waveguide propagating light as described in the Japanese laid-open patent application No. 63-61430, remarkably great light quantity may be obtained and the RF signal may be generated excellently.

Further, at the upper position of the second light receiving portion 22 which is used to generate the focus error signal, the optical waveguides are formed in three-layer structure with the SOG layers 26 being sandwiched therebetween, and those waveguides are positioned closely to one another. By this, the guiding mode of the optical waveguide is efficiently changed to the radiation mode, and the light path length from the grating 29 to the second light receiving portion 22 is ensured to be sufficiently long so as to generate the focus error signal by the beam-size method. Therefore, the variation of the focal point position of the laser light on the optical disc 8 may be greatly reflected on the area increase/decrease of the radiated light on the second light receiving portion 22, thereby improving the SIN ratio in comparison with the conventional method. Further, with respect to the radiation power of the radiated light, the incident coupling efficiency of the optical waveguide 27 is increased by optimizing the SOG layer 26 under the grating 26, and the radiation power is increased by reducing the thickness of the SOG layer 26 on the second light receiving portion 22 in the above-mentioned multi-layer structure. Therefore, sufficient light quantity may be obtained at the second light receiving portion 22.

Still further, with respect to the second light receiving portion for generating the focus error signal, the radiation mode light is used as described above. Therefore, the light receiving surface of the second light receiving portion 22 may be horizontal with respect to the optical axis of the guided light by the optical waveguide, and the first light receiving portion 21 for generating the RF signal and the second light receiving portion 22 for generating the focus error signal may be formed on the same plane on the semiconductor substrate 20. As a result, the light receiving portion, the optical waveguide and the grating may be easily laminated on the same substrate by the IC process, thereby downsizing the whole optical integrated device.

Particularly, the above described light receiving portion has the same structure as that of general photodetector or OEIC. Therefore, the manufacturing of photodetector or OEIC, and the manufacturing of the optical integrated device may be achieved only by the pattern change, without process change, thereby remarkably reducing the manufacturing cost.

[2] 2nd Embodiment

Next, the second embodiment of the present invention will be described with reference to FIG. 19. It is noted that the same elements as those in the first embodiment are represented by the same reference numerals and their description will be omitted.

Figure 19:
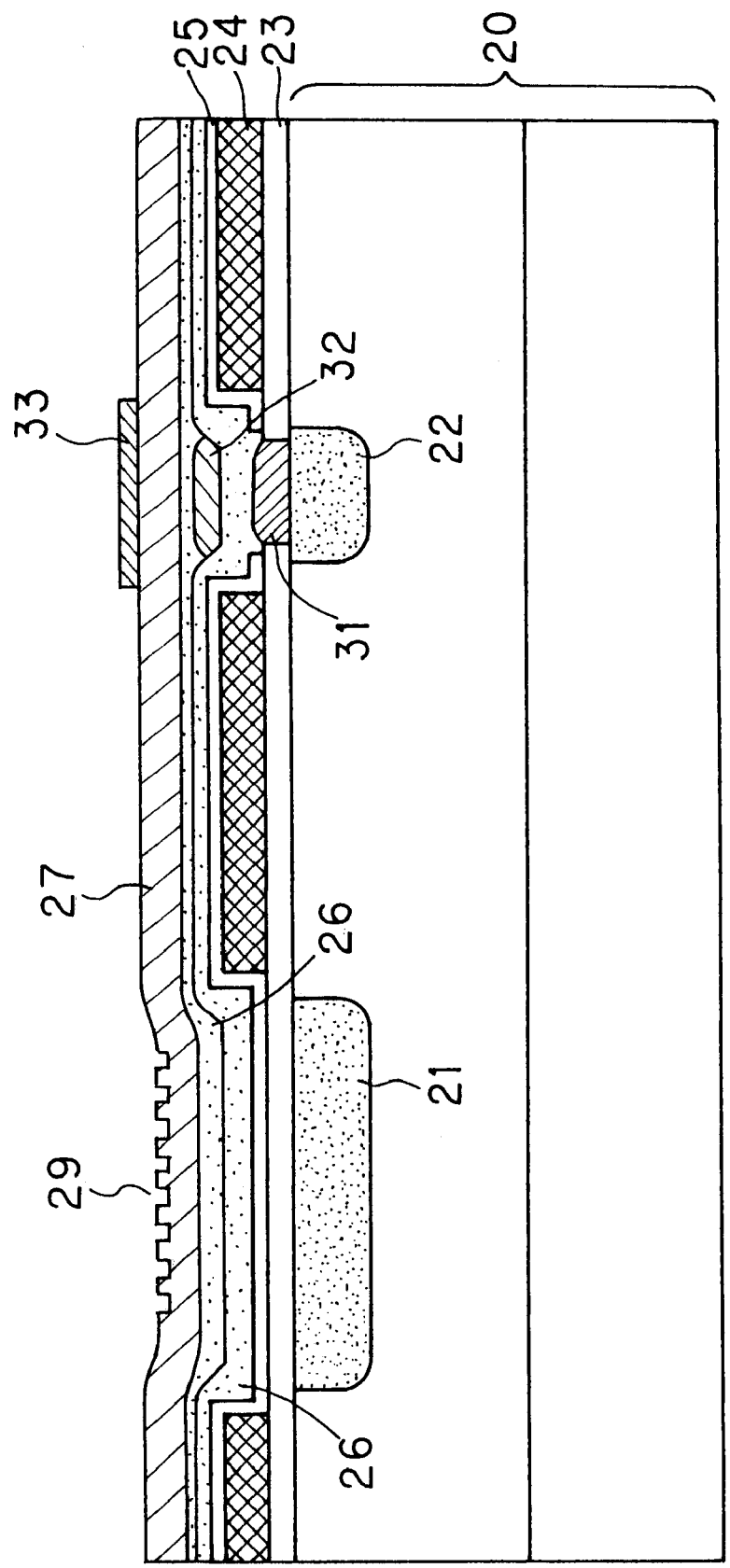
FIG. 19 is a sectional view showing the schematic configuration of the optical integrated device according to the second embodiment.

As shown in FIG. 19. this embodiment is different from the first embodiment in that the light-shielding film 33 of aluminum is formed on the optical waveguide 27 of the uppermost layer at the area corresponding to the area where the second light receiving portion 22 is formed. When the objective lens 7 shown in FIG. 16 moves up and down with respect to the optical disc 8, the light irradiated area to the grating 29 varies, and the light may be directly incident upon the second light receiving portion 22 without passing through the optical waveguide. As a result, noise component is generated in the focus error signal, the S/N ratio is deteriorated, and the focus servo becomes unstable.

In this embodiment, the light shielding film 33 of aluminum is formed on the optical waveguide 27 of the uppermost layer at the area corresponding to the area where the optical waveguide 31 of the lowermost layer and the second light receiving portion 22 are formed. This light-shielding film 33 reliably eliminates the light incoming without passing through the optical waveguide as described above, and only the light coming through the optical waveguide may be incident upon the second light receiving portion 22. As a result, no noise component is generated in the focus error signal and the S/N ratio is improved, thereby enabling stable focus servo. It is noted that the light-shielding layer 33 may be made of other material than aluminum, which has light shielding property.

[3] 3rd Embodiment

Next, a third embodiment of the present invention will be described with reference to FIGS. 20 and 21. It is noted that the same elements as those of the first embodiment are represented by the same reference numerals and their description will be omitted.

In place of the going-path/returning-path separation film 30 of the first embodiment, this embodiment uses the grating coupler including the gratings 40, 41 and the optical waveguide 42 is used as a going-path/returning-path separation means. This is the difference from the first embodiment. Between the optical waveguide 42 and the SOG layer 28, the SiO₂ layer 34 for adjusting the distance between the optical waveguide 42 and the grating 29 is provided. The grating 40 serving as the second light coupling means couples the diverging light from the semiconductor laser 12 to the optical waveguide 42 as the second optical waveguide, and couples the TM-mode laser light to the optical waveguide 42, for example. The pattern is a curving chirped pattern.

The grating 41 radiates the diverging light propagating through the optical waveguide 42 to outside with a predetermined angle, and radiates TM-mode laser light, for example. The grating 41 transmits the incident light from outside, for example, TE-mode laser light.

Figure 20:
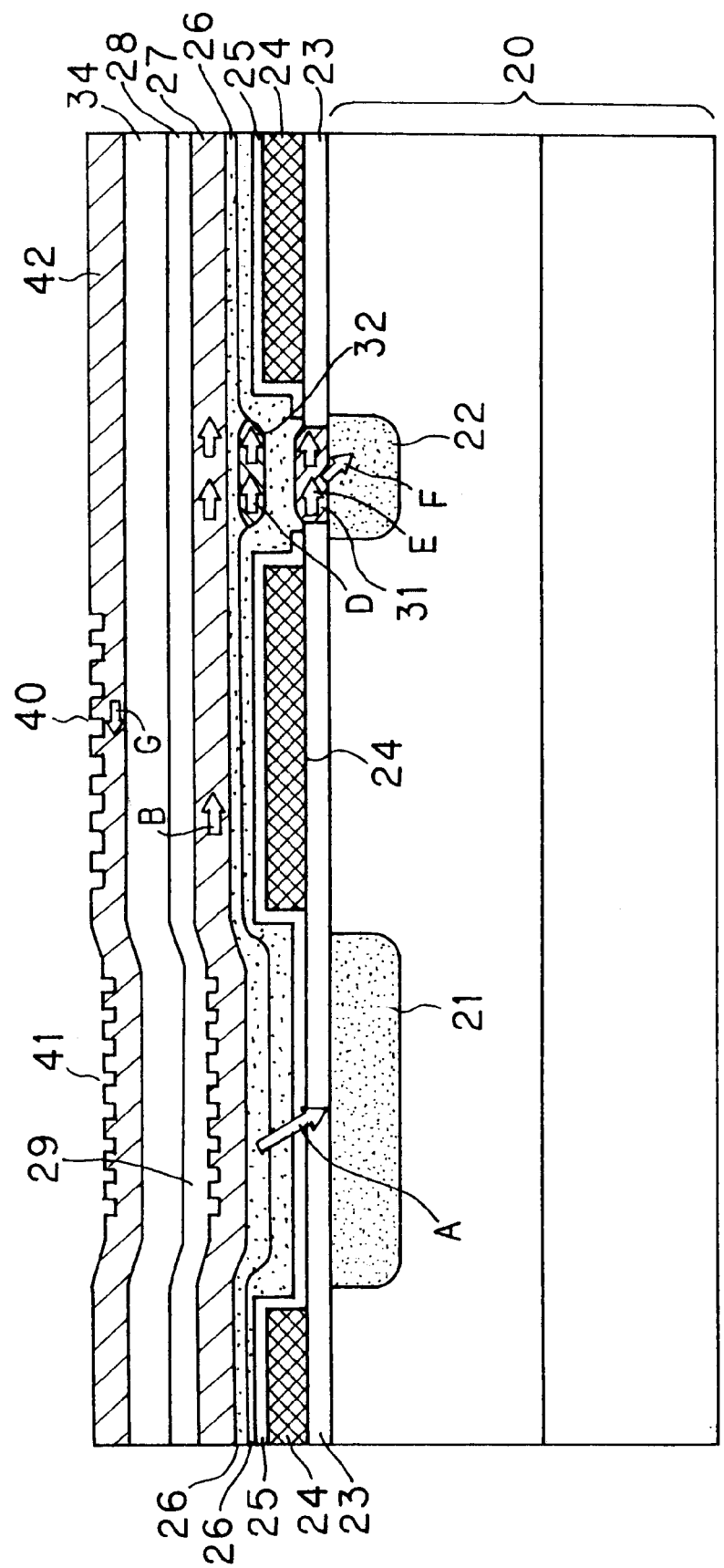
FIG. 20 is a sectional view showing the schematic configuration of the optical integrated device according to the third embodiment.
Figure 21:
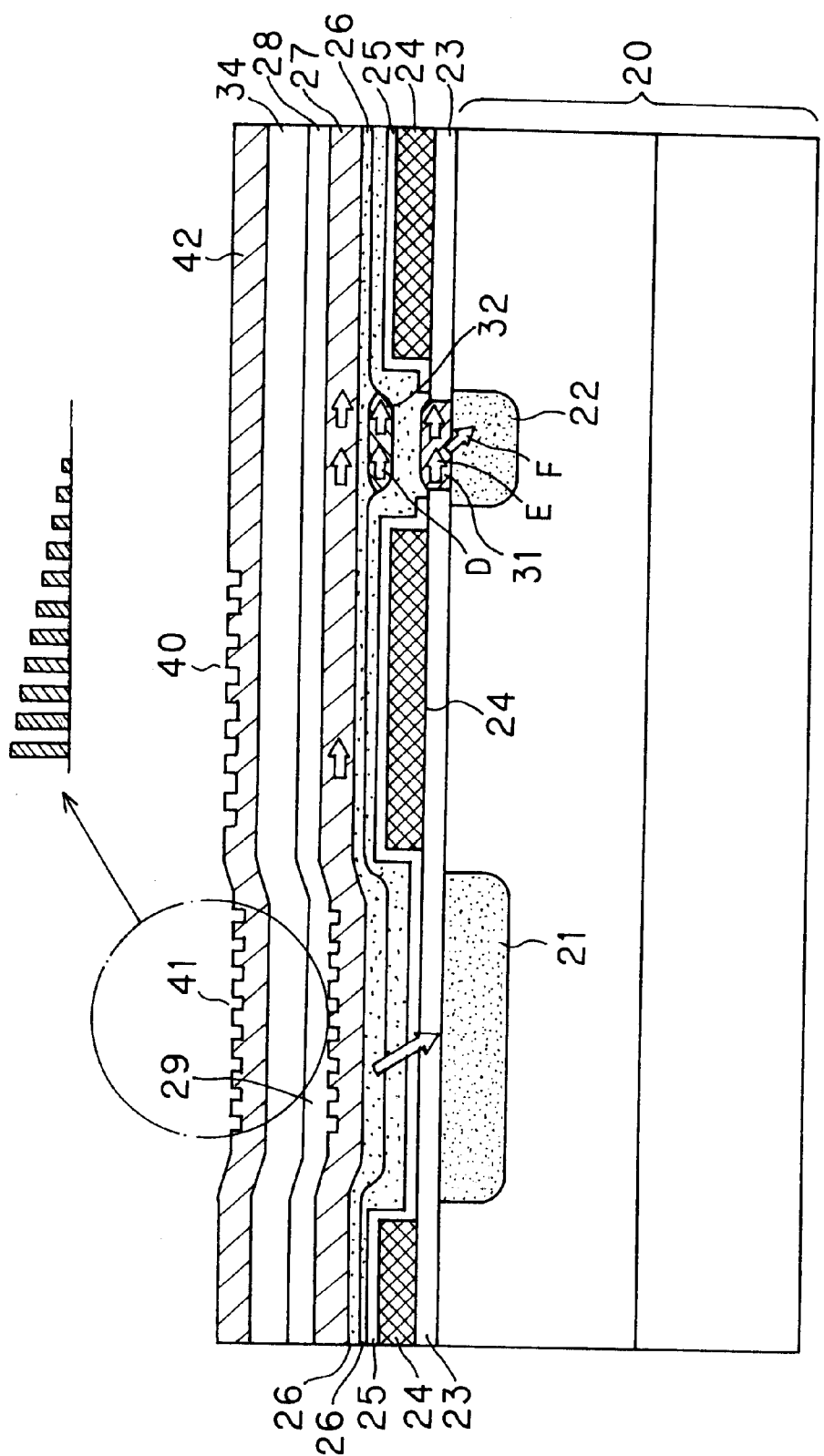
FIG. 21 is a sectional view showing the modification of the grating in the optical integrated device shown in FIG. 19.

With the above configuration, when the semiconductor laser 12 irradiates the laser light to the grating 40, the TM-mode laser light is coupled to the optical waveguide 42 by the grating 40 and propagates through the optical waveguide 42 in the direction of the arrow G in FIG. 20.

Then, the TM-mode laser light thus propagating is radiated to outside by the grating 41, and is focused onto the information recording surface of the optical disc 8 via the reflective mirror 5, the collimator lens 6 and the objective lens 7, as shown in FIG. 16. If the grating coupler is used as the going-path/returning-path separation means, the ¼-wavelength plate is necessary.

On the other hand, the returning light from the optical disc 8 is incident upon the grating 41 via the reverse route. This returning light is TE-mode laser light, and the grating 41 transmits this TE-mode laser light. The transmitted laser light is divided into the transmissive light and the guided light by the grating 29 and then received by the first light receiving portion 21 and the second light receiving portion 22, similarly to the first embodiment.

Since the output-coupling of the grating coupler generally causes the light quantity distribution. By varying the height of the grating 41 as shown in FIG. 21, the light quantity distribution may be corrected to become similar to the Gaussian distribution. This shape may be determined by the radiation loss coefficient and the propagation distance of the grating coupler, and it may be produced by the lift-off using the mask sputtering method.

As described above, if the grating coupler is used as the going-path/returning-path separation means, in place of the dielectric multi-layer film, sufficient amount of light may be received to generate an RF signal, a tracking error signal and a focus error signal with high S/N ratio.

Figure 22:
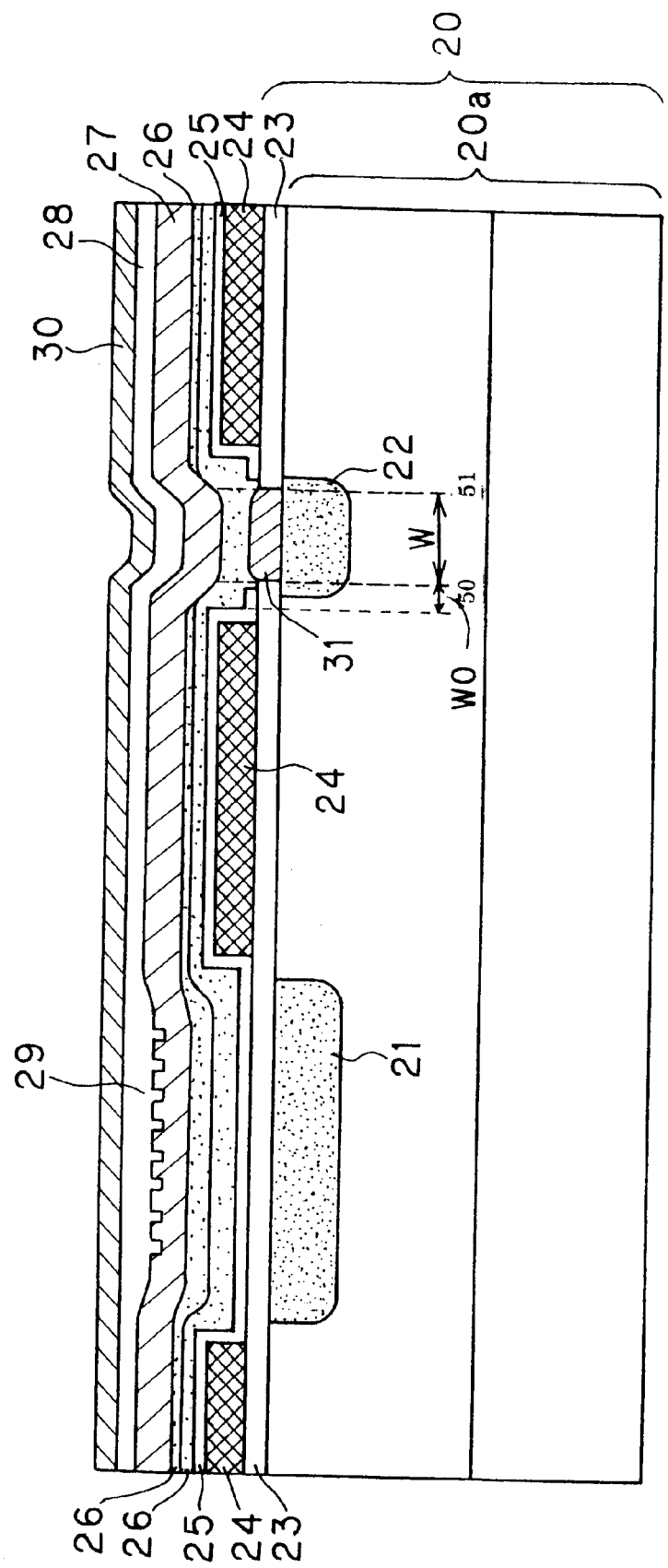
FIG. 22 is a sectional view showing the modification of the optical waveguide of the uppermost layer in the optical integrated device of the present invention.

In the embodiments describe above, the optical waveguide of the uppermost layer has the shape of extending straightly in the horizontal direction. However, the present invention is not limited to this feature. For example, the SOG layer 26 on the second light receiving portion 22 may be formed to have a slope at the area of the length WO before the non-processed area of length W where no heat-oxidized layer 23 and protection layer 25 are formed, and the optical waveguide 27 of the uppermost layer may be curved to fit this slope. For example, as shown in FIG. 22, the optical waveguide 32 of the intermediate layer may be omitted by curving the optical waveguide 27 of the uppermost layer to the position of the optical waveguide 32 of the intermediate layer.

In the above embodiments, the second light receiving portion 22 is used to generate a focus error signal. However, the present invention is not limited to this. For example, the second light receiving portion 22 may be used to generate an RF signal or a tracking error signal. Further, while the lower surface of the optical waveguide of the lowermost layer contacts the upper surface of the second light receiving portion 22 in the above embodiment, the present invention is not limited to this configuration. The edge of the optical waveguide of the lowermost layer may contact the surface of the second light receiving portion 22.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.11-152704 filed on May 31, 1999 including the specification, claims, drawings and summary is incorporated herein by reference in its entirety.

What is claimed is:

1. An optical integrated device for use in an optical pickup device which irradiates a light onto an optical information storage medium and receives a reflected light reflected by the storage medium, the optical integrated device comprising:

a light wave coupling element for generating at least a guided light from the reflected light;

an optical waveguide unit for propagating the guided light, said optical waveguide unit comprising an optical waveguide laminated structure, which laminated structure comprises multiple optical waveguides that have identical refractive indexes and clad layers formed between the optical waveguides; and a light receiving element for receiving the light from the optical waveguide unit, wherein the optical waveguide unit comprises three or more waveguides, the clad layers have identical refractive indexes, and the optical waveguide of an uppermost layer and the optical waveguide of a lowermost layer have thicknesses larger than thickness of the optical waveguide at intermediate layer between the uppermost layer and the lowermost layer.

2. An optical integrated device for use in an optical pickup device which irradiates a light onto an optical information storage medium and receives a reflected light reflected by the storage medium, the optical integrated device comprising:

a light wave coupling element for generating at least a guided light from the reflected light;

an optical waveguide unit for propagating the guided light, said optical waveguide unit comprising an optical waveguide laminated structure, which laminated structure comprises multiple optical waveguides that have identical refractive indexes and clad layers formed between the optical waveguides; and a light receiving element for receiving the light from the optical waveguide unit, wherein the clad layers have identical refractive indexes, the light wave coupling element, the optical waveguide unit and the light receiving element are formed on a semiconductor substrate in a laminated fashion, and the light receiving element receives a radiated light which is radiated by the optical waveguide to the semiconductor substrate due to phase matching.

3. An optical integrated device according to claim 2, further comprising a light shielding film formed on the optical waveguide of the uppermost layer at a position corresponding to a position of the light receiving element.

* * * * *